United States Patent [19]
Yoshinaka et al.

[11] Patent Number: 4,714,965
[45] Date of Patent: Dec. 22, 1987

[54] WRITE CLOCK PULSE GENERATOR USED FOR A TIME BASE CORRECTOR

[75] Inventors: Tadaaki Yoshinaka; Takao Inoue; Kazuo Tomita, all of Kanagawa, Japan

[73] Assignee: Sony Corporation, Tokyo, Japan

[21] Appl. No.: 807,745

[22] Filed: Dec. 11, 1985

[30] Foreign Application Priority Data

Dec. 25, 1984 [JP] Japan ................. 59-279427

[51] Int. Cl.⁴ ............ H04N 9/89; H04N 5/85; H04N 5/78
[52] U.S. Cl. ................ 358/320; 358/324; 358/339; 360/36.2
[58] Field of Search ........... 358/324, 320, 339, 19; 360/36.2

[56] References Cited

U.S. PATENT DOCUMENTS

| | | | |
|---|---|---|---|
| 4,015,288 | 3/1977 | Ebihara et al. | 358/339 X |
| 4,069,499 | 1/1978 | Ninomiya | 358/8 |
| 4,077,046 | 2/1978 | Morio | 358/324 |
| 4,109,277 | 8/1978 | Schylander | 358/320 |
| 4,422,103 | 12/1983 | Kanamaru | 358/320 |
| 4,445,092 | 4/1984 | Yoshinaka et al. | 328/139 |

Primary Examiner—E. A. Goldberg
Assistant Examiner—Patrick W. Foster
Attorney, Agent, or Firm—Lewis H. Eslinger; Alvin Sinderbrand

[57] ABSTRACT

In a time base corrector for correcting time base fluctuations of signals reproduced from a record medium, on which a plurality of time-compressed component signals occurring within one horizontal period in a predetermined sequential order are recorded in response to a clock signal with a predetermined frequency, a write clock pulse generator used in the time base corrector includes a phase shifter for shifting the phase of an incoming write clock signal, whereby the write clock signal having a frequency different from the predetermined frequency is generated in response to a horizontal synchronizing signal, the start time of each of the plurality of reproduced component signals is detected and the shifting amount of the write clock signal by the phase shifter is switched in accordance with the detected output so as to synchronize the write clock signal with the start time of each of the reproduced component signal.

8 Claims, 11 Drawing Figures

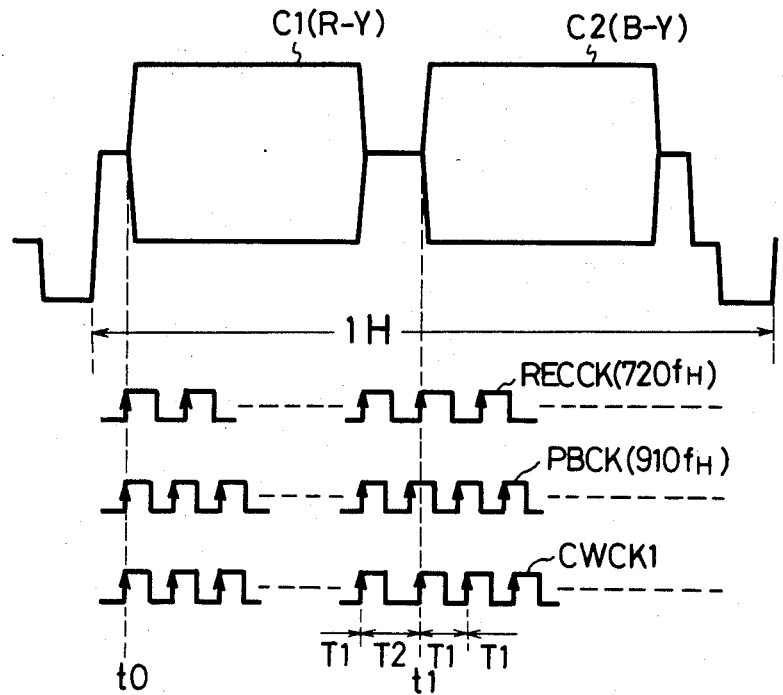
FIG. 1A
FIG. 1B
FIG. 1C
FIG. 1D
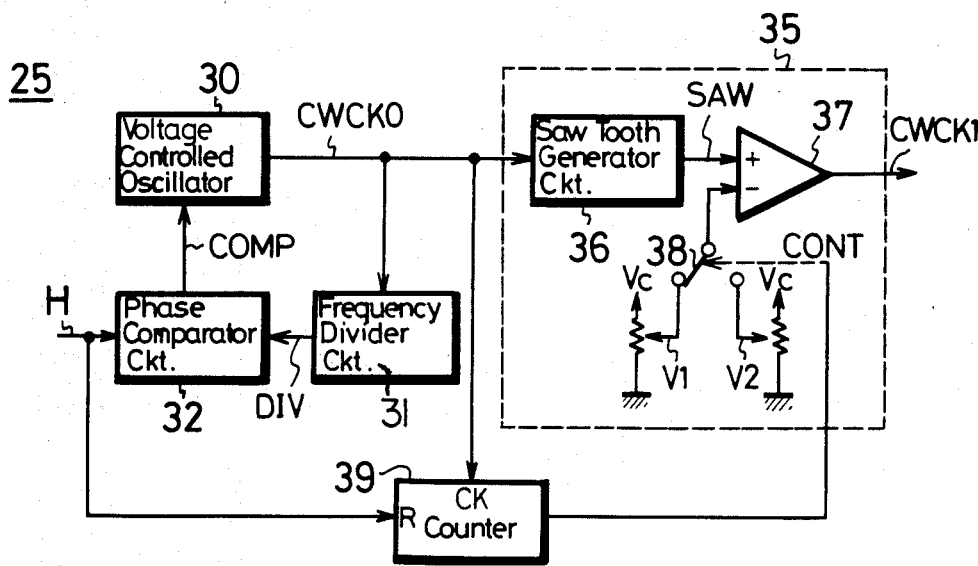
FIG. 3

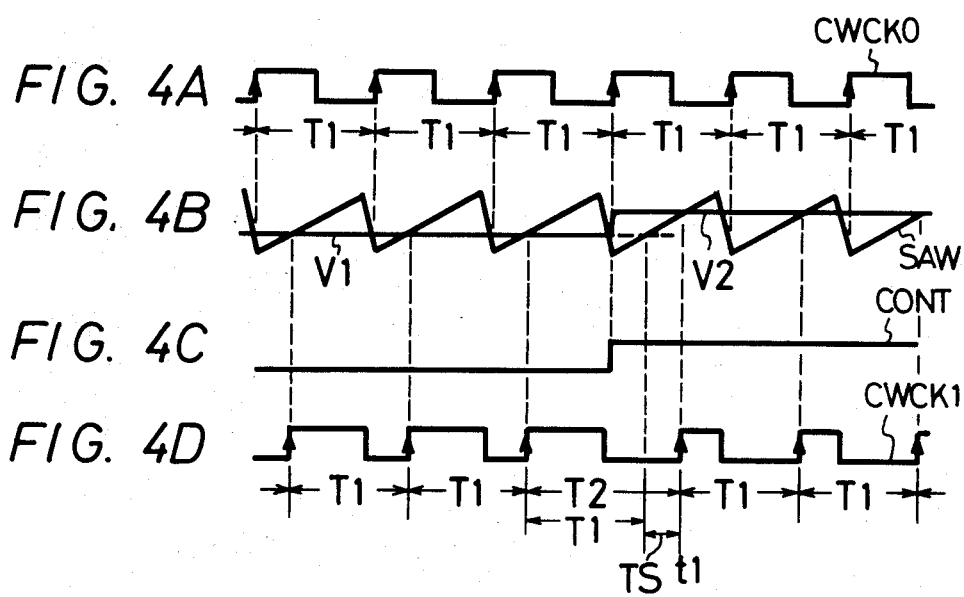
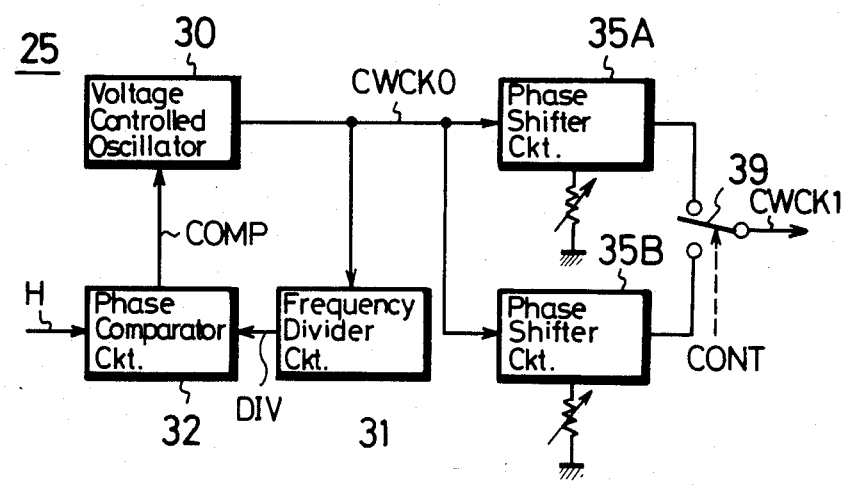

WRITE CLOCK PULSE GENERATOR USED FOR A TIME BASE CORRECTOR

BACKGROUND OF THE INVENTION

1. Field of the Invention

This invention relates generally to a write clock pulse generator used for a time base corrector (TBC) and more particularly to a write clock pulse generator used for an apparatus for recording and/or reproducing a video signal which is time-compressed and multiplexed.

2. Description of the Prior Art

In a prior art video tape recorder (VTR), component signals, such as a luminance signal, color difference signals and so on forming a video signal are time-compressed, frequency-multiplexed as shown in FIG. 1A and then recorded, while upon reproducing, the time-compressed and frequency-multiplexed signals are divided, time-expanded and then generated as a reproduced video signal.

In such VTR, the frequency of a write clock pulse used for carrying out the time-compressing and multiplexing upon recording mode and the frequency of a write clock pulse used for carrying out the time-dividing-and-expanding upon reproducing mode are made the same as each other, whereby the respective reproduced component signals are synchronized with one another.

However, the fact that the frequency of the clock signal upon recording and the frequency of the clock signal upon reproducing are made the same as each other means that the frequency of the clock signal upon reproducing is restricted by the frequency of the clock signal upon recording. In practice, if circuits formed of ICs and the like having the same design concept are applied to VTRs of different specifications, the apparatus can be produced with ease and at low manufacturing cost. Accordingly, it is desirable to use the same circuit even when the frequency of the clock signal upon recording and the frequency of the clock signal upon reproducing are different.

When a digital signal is processed by the circuit at the reproducing side (for example, the digital signal is balance-modulated), in most of the circuits, a clock signal having a frequency of a multiple of a color subcarrier (for example, 4 times) is employed. If the frequency of the clock signal used for the time division and expansion upon playback is selected to be the same as the frequency of the clock signal for the digital processing, there will be brought about many advantages in circuit arrangement and signal processing. Accordingly, even if the frequency of the clock signal used in the time division and expansion upon reproducing is different from the frequency of the clock signal used in time-compressing and multiplexing upon recording, consideration should be given to making the frequency of the clock signal used for time division and expansion upon reproducing coincide with the mentioned multiple of the frequency of the color subcarrier.

However, if a frequency $N_1 f_H$ (for example, $720 f_H$ and $f_H$ is the horizontal scanning frequency) of a clock signal RECCK (FIG. 1B) upon recording is made different from a frequency $N_2 f_H$ (for example, $910 f_H$) of a clock signal PBCK (FIG. 1C) upon reproducing, when the phases of the clock signals RECCK and PBCK are made coincident at the beginning of a component signal $C_1$ (for example, a color difference signal $R-Y$) which is time-compressed to the former half H/2 as, for example, shown in FIG. 1A, the phases of the clock signals RECCK and PBCK do not remain coincident at the beginning of a component signal $C_2$ (for example, a color difference signal $B-Y$) which is time-compressed to the latter half H/2. As a result, the time expanded and then composed video signal causes a color displacement relative to the original video signal. For instance, when the first component signal $C_1$ is the color difference signal $R-Y$ and the second component signal $C_2$ is the color difference signal $B-Y$, a complete color signal can not be obtained due to the above mentioned color displacement.

OBJECTS AND SUMMARY OF THE INVENTION

Accordingly, it is an object of this invention to provide a write clock pulse generator used for a time base corrector which can, even when a frequency of a time-compressing and multiplexing sampling clock pulse at a recording side and a frequency of a write clock pulse used in time dividing and expanding are different from each other, the phases of component signals can be made coincident with each other upon time expansion.

Another object of this invention is to provide a write clock pulse generator used for a time base corrector, by which the sampling clock frequency at a reproducing side is not restricted by a sampling clock frequency at a recording side so that the same circuit arrangement can be applied to various kinds of reproducing apparatus.

A further object of this invention is to provide a write clock pulse generator used for a time base corrector which is suitably applied to a video tape recorder.

According to one aspect of this invention there is provided an apparatus for processing a plurality of component video signals which are time-compressed and arranged in sequence in one horizontal scanning period comprising:

(a) means for sampling said time-compressed component video signals in response to a sampling clock pulse;

(b) means for time-expanding said time-compressed component video signals from said sampling means;

(c) a generator for generating a control signal representing a starting position of each of said time-compressed component video signals; and (d) a phase shifter for shifting a phase of said sampling clock pulses in response to said control signal.

These and other objects, features and advantages of the present invention will become apparent from the following detailed description of the preferred embodiments taken in conjunction with the accompanying drawings, throughout which like reference numerals designate like elements and parts.

BRIEF DESCRIPTION OF THE DRAWINGS

FIGS. 1A to 1D are diagrams useful for explaining a phase relationship between a time-compressed and -multiplexed signal and sampling clock signals, respectively;

FIG. 3 is a block diagram showing an embodiment of a write clock pulse generator used for a time base corrector according to the present invention;

FIGS. 4A to 4D are respectively waveform diagrams useful for explaining the operation of respective circuit sections shown in FIG. 3; and FIG. 5 is a block diagram showing another embodiment of the present invention.

DESCRIPTION OF THE PREFERRED EMBODIMENTS

Figure 2:
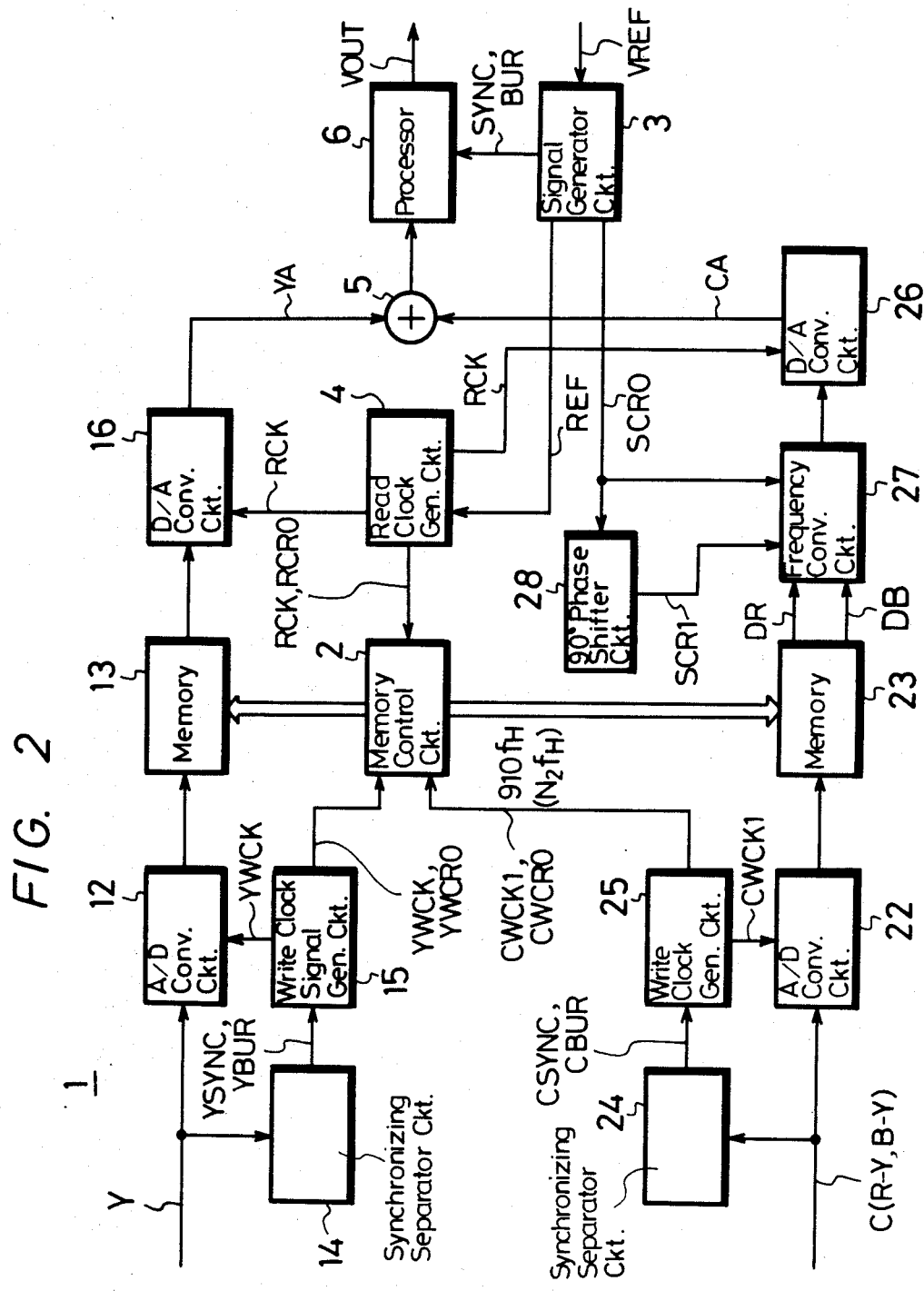
FIG. 2 is a block diagram showing an example of a time base corrector to which an embodiment of the present invention can be applied.

Now, the present invention will hereinafter be described in detail with reference to the drawings. FIG. 2 is a block diagram showing a time base corrector in which an embodiment of a write clock pulse generator according to this invention is employed.

In FIG. 2, reference numeral 1 generally designates an overall circuit arrangement of a time base corrector (TBC). A luminance signal Y and a chrominance signal C are respectively reproduced from different stacks by different magnetic heads and fed to this time base corrector 1. The luminance signal Y is recorded on one of two adjacent tracks of a magnetic tape, while the chrominance signal C is formed of color difference signals R−Y and B−Y which are time-compressed to H/2 and are recorded in sequence on the other track. The frequency $N_1 f_H$ of the sampling clock signal upon recording is selected to be, for example, $720 f_H$, as shown in FIG. 1B.

The reproduced luminance signal Y is converted to a ditigal signal by an A/D (analog-to-digital) converter circuit 12 and then fed to a memory 13. Also, the reproduced luminance signal Y is fed to a synchronizing separator circuit 14 by which a synchronizing signal YSYNC and a burst signal YBUR are separated and then fed to a luminance signal write clock signal generator circuit 15. The write clock signal generator circuit 15 generate a clock signal YWCK which has a frequency of, for example, $910 f_H$ and which will start at a predetermined phase of the burt signal YBUR. This clock signal YWCK is supplied to the A/D converter circuit 12 as the sampling pulse and to a memory control circuit 2 as a luminance write clock signal. The write clock generator circuit 15 furter generates a luminance write zero clear signal YWCR0 on the basis of a horizontal synchronizing signal H and this signal YWCR0 is fed to the memory control circuit 2. The timing of this luminance write zero clear signal YWCR0 is selected to occur immediately before the line of the produced luminance signal Y is generated.

When the memory control circuit 2 is supplied with the luminance write zero clear signal YWCR0, it specifies the write start address of the memory 13 and allows the memory 13 to sequentially store therein picture element data of the reproduced luminance signal Y by sequentially specifying the memory area of the memory 13 in synchronism with the write clock signal YWCK.

The reproduced chrominance signal C is stored in a memory 23 according to a substantially similar circuit arrangement to the above. That is, the reproduced chrominance signal C is converted to a digital signal by an A/D converter circuit 22 and then fed to the memory 23. Also the reproduced chrominance signal C is supplied to a synchronizing separator circuit 24 by which a synchronizing signal CSYNC and a burst signal CBUR are separated and then fed to a chrominance write clock generator circuit 25. This write clock generator circuit 25 generates a clock signal CWCK1 having a frequency $N_2 f_H$ of, for example, $910 f_H$. This clock signal CWCK1 is supplied to the A/D converter circuit 22 as the sampling pulse and to the memory control circuit 2 as the chrominance write clock signal. Further the write clock generator circuit 25 generates a chrominance write zero clear signal CWCR0 on the basis of the horizontal synchronizing signal and delivers the same to the memory control circuit 2.

Accordingly, when the memory control circuit 2 is supplied with the chrominance write zero clear signal CWCR0, it specifies the write start address of the memory 23 and allows the memory 23 to sequentially store therein the picture element data of the reproduced chrominance signal C by sequentially specifying the memory areas in synchronism with the write clock signal CWCK1.

The chrominance write clock signal generator circuit 25 according to an embodiment of the present invention is constructed as shown in FIG. 3. FIG. 3 is a block diagram showing in detail a construction of a section of the chrominance write clock generator circuit 25 for generating the write clock signal CWCK1.

Referring to FIG. 3, a voltage controlled oscillator (VCO) 30 generates an oscillation output CWCK0 having the frequency $N_2 f_H$ of the write clock signal and supplies it to a phase shifter circuit 35 and a frequency divider circuit 31. The frequency divider circuit 31 divides the oscillation output CWCK0 by $N_2$ to produce a frequency-divided signal DIV. The frequency-divided signal DIV therefrom is phase-compared with the horizontal synchronizing signal H of a frequency $f_H$ formed from the reproduced chrominance signal C in a phase comparator circuit 32 and the oscillation output CWCK0 of the VCO 30 is phase-controlled in response to the phase difference COMP therebetween. Thus, the VCO 30 delivers to the phase shifter circuit 35 and to the frequency divider circuit 31 the oscillation output CWCK0 which has the time base fluctuation similar to that of the reproduced chrominance signal C as shown in FIG. 4A.

In the phase shifter circuit 35, a saw tooth generator circuit 36 is supplied with the oscillation output CWCK0 and generates a saw tooth wave signal SAW (FIG. 4B) which begins to increase its level from the leading edge of the oscillation output signal CWCK0. This saw tooth wave signal SAW is fed to one input terminal of a comparator circuit 37. The comparator circuit 37 is supplied at the other input terminal with a DC voltage V1 or V2 through a switching circuit 38. The compared output from the comparator circuit 37 is supplied to the A/D converter circuit 22 and to the memory control circuit 2 (FIG. 2) as the chrominance write clock signal CWCK1.

When the DC voltage V1 if fed to the comparator circuit 37, the chrominance write clock signal CWCK1 becomes a signal which has as shown on FIG. 4D in its left half portion a period T1 that is the same as the oscillation output signal CWCK0 (FIG. 4A). FIG. 4A illustrates a case in which the oscillation output CWCK0 has no time base fluctuation. When the DC voltage V2 which has a level higher than the DC voltage V1 is supplied to the comparator circuit 37, the write clock signal CWCK1 becomes a signal having the same period T1 as that of the oscillation output CWCK0 as shown in FIG. 4D in its right half portion. However, just after the DC voltage fed to the comparator circuit 37 is switched from V1 to V2 in response to the switching circuit 38 being changed by a switching control signal CONT (FIG. 4C), the rising period of the write clock signal CWCK1 becomes T2. Accordingly, by switching the logic level of the switching control signal CONT, the phase of the leading edge of the write clock signal CWCK1 is displaced by a time $TS(=T2-T1)$ shown in FIG. 4D.

The switching control signal CONT switches its logic level in such a manner that the rising time point t1 at which the phase displacement occurs coincides with a start time point t1 of the time-compressed color difference signal B−Y appearing in the latter half of the 1H period of reproduced chrominance signal C as shown in FIG. 1D. For example, when the oscillation output CWCK0 from the VCO 30 is counted by a counter 39 and the count reaches to a predetermined number, the switching control signal CONT therefrom is inverted in its logic level. This counter 39 is reset by, for example, the horizontal synchronizing signal H.

The timing at which the logic level of the control signal CONT is inverted is such that the start time point t0 (FIG. 1D) of the color difference signal R−Y is synchronized with the write clock signal CWCK1 and can be detected on the basis of, for example, the chrominance write zero clear signal CWCR0.

Consequently, as shown in FIG. 1D, the chrominance write clock signal CWCK1 is generated for both of the color difference signals R−Y and B−Y in synchronism with their start time points t0 and t1, storing the picture element data of the color difference signals R−Y and B−Y which are synchronized with each other, in the memory 23.

Turning back to FIG. 2, on the basis of a reference video signal VREF delivered from the outside, a signal generator circuit 3 generates a reference signal REF which is then fed to a read clock generator circuit 4. This reference signal REF has a stable period. In response to this reference signal REF, the read clock generator circuit 4 generates a read clock signal RCK having a frequency $N_2 f_H$ substantially the same as the write clock signals YWCK and CWCK1. This read clock signal RCK is then fed to the memory control circuit 2. Further, in response to the reference signal REF, the read clock generator circuit 4 generates and supplies a read zero clear signal RCR0 to the memory control circuit 2.

When the memory control circuit 2 is supplied with the read zero clear signal RCR0, it specifies the memory area at the write start address as a read address data for the luminance signal memory 13 and the picture element data stored in the memory 13 are read out sequentially in synchronism with the read clock signal RCK and then fed sequentially to a D/A (digital-to-analog) converter circuit 16. The picture element data read out is converted to an analog signal YA by the D/A converter circuit 16 and then fed to an adding circuit 5.

When the memory control circuit 2 is supplied with the read zero clear signal RCR0 it specifies the memory area at the address in which the first picture element data of the color difference signal R−Y is stored and the memory area at the address in which the first picture element data of the color difference signal B−Y is stored as the read address data for the chrominance signal memory 23. Thereafter, the picture element data DB of the color difference signal B−Y and the picture element data DR of the color difference signal R−Y stored in the memory 23 are read out and delivered alternately and sequentially to a frequency converter circuit 27 in synchronism with the read clock signal RCK. Thus, the read out from memory 23 of the data corresponding to each color difference signal is carried out in a period which is one-half that required for the read-out of luminance signal Y from memory 13. Then, the read-out divided picture element data DR and DB are fed from the memory 23, to the frequency converter circuit 27 and are time-expanded.

The frequency converter circuit 27 is supplied with a reference color subcarrier signal SCR0 directly from the signal generator circuit 3 and also a reference color subcarrier signal SCR1 which is provided by phase-shifting the signal SCR0 through a 90° phase shifter circuit 28. These reference color subcarrier signal SCR0 and the reference color subcarrier signal SCR1 are balance-modulated by the color difference signal picture element data DR and DB in a digital fashion, generating a digital carrier chrominance signal which is fed to a D/A converter circuit 26. The D/A converter circuit 26 converts it to an analog signal CA and supplies this signal CA to the adding circuit 5.

The adding circuit 5 is adapted to add the luminance signal YA the time base of which was corrected and the time-expanded, divided and modulated in quadrature bi-phase system carrier chrominance signal CA. The added signal therefrom is fed to a processor 6. In the processor 6, the added signal is added with the synchronizing signal SYNC and the burst signal BUR from the signal generator circuit 3 and the output level thereof is adjusted and then delivered as a composite video signal VOUT.

According to the circuit arrangement as mentioned above, in synchronism with the synchronizing signal YSYNC contained in the reproduced luminance signal Y, the respective picture element data of the reproduced luminance signal Y are converted to digital data by the A/D converter circuit 12 while the time base fluctuation thereof is accompanied and then sequentially stored in the memory 13. The data are sequentially read out and fed to the D/A converter circuit 16 in response to the read clock signal RCK having the stable period base on the reference signal REF. Thus, the luminance signal YA has its time base corrected when it is fed to the adding circuit 5.

On the other hand, in synchronism with the synchronizing signal CSYNC contained in the reproduced chrominance signal C, the picture element data of the reproduced chrominance signal C are sequentially converted to the digital data by the A/D converter circuit 22 while the time base fluctuation thereof is accompanied and then sequentially stored in the memory 23. The data stored are time-expanded by the read clock signal RCK at every color difference signal R−Y and B−Y components DR and DB and then fed to the frequency converter circuit 27. The data read out is balance-modulated by the frequency converter circuit 27 in a digital fashion and fed to the D/A converter circuit 26. Thus, the carrier chrominance signal CA also has its time base corrected when it is supplied to the adding circuit 5.

The reproduced luminance signal YA and the carrier chrominance signal CA with the time base corrected are added to each other by the adding circuit 5 and then added with the synchronizing signal SYNC and the burst signal BUR by the processor 6, thus delivering the composite video signal VOUT from the output terminal.

According to the time base corrector of FIG. 2 using the chrominance write clock generator circuit 25 shown in FIG. 3, even when the chrominance write clock signal CWCK1 has a frequency different from the frequency of the clock signal at the recording side, the write clock signal CWCK1 can be generated in synchronism with both start time points t0 and t1 of the color difference signals R−Y and B−Y contained in the reproduced chrominance signal C, and the synchronization between the picture element data of the color difference signals R−Y and B−Y stored in the memory 23 can be established. Therefore, it is possible to prevent the output video signal VOUT, which is modulated in orthogonal bi-phase system and then added to the luminance signal YA, from being displaced in color.

FIG. 5 is a block diagram showing another embodiment of the present invention. In FIG. 5, like parts corresponding to those of FIG. 3 are marked with the same references and will not be described in detail. In the case of this embodiment, the chrominance write clock generator circuit 25 includes two phase shifter circuits 35A and 35B each of which is formed of a saw tooth generator circuit and a comparator circuit (shown in FIG. 3). The phase shifter circuits 35A and 35B are adapted to shift the oscillaion output CWCK0 from the VCO 30 and in this case, the shift amount of the phase shifter circuit 35B is selected to be large as compared with that of the phase shifter circuit 35A. A switching circuit 39 is controlled in its changing-over by the switching control signal CONT such that when the color difference signal R−Y is reproduced, the output signal from phase shifter circuit 35A is delivered, while when the color difference signal B−Y is reproduced, the output signal from the phase shifter circuit 35B is delivered. Accordingly, by controlling the switching timing of the switching circuit 39, the clock pulse generator circuit 25 generates the write clock signal CWCK1 shown in FIG. 4D.

When the clock pulse generator circuit 25 shown in FIG. 5 is used, the color difference signals R−Y and B−Y can be stored in the memory 23 similarly to the clock pulse generator circuit 25 of FIG. 3, thus to prevent the output video signal VOUT from being displaced in color.

While the above mentioned embodiments employ the time-compressed and multiplexed signal that is formed such that the color difference signal R−Y is time-compressed and recorded on the former half H/2 of the horizontal interval, while the color difference signal B−Y is time-compressed and recorded on the latter half thereof, this invention is not limited to the above signal but can be applied to various time-compressed and -multiplexed signals. For example, this invention can be applied to a time-compressed and -multiplexed signal in which the luminance signal Y and the color difference signals R−Y and B−Y are respectively recorded on the succeeding intervals H/2, H/4 and H/4 of one horizontal period. In short, regardless of the kinds of the time-compressed and -multiplexed signals, this invention can be applied to a case in which the sampling clock frequency $N_2 f_H$ at the recording side and the sampling clock frequency $N_1 f_H$ at the reproducing side are different from each other.

According to the present invention as set forth above, since the sampling clock signals are generated in synchronism with the start time points of the respective component signals at the reproducing side, the respective component signals can be composed under the condition that the respective signals are synchronized with one another. Furthermore, even in the apparatus in which the sampling clock frequency at the recording side and the sampling clock frequency at the reproducing side are different from each other, it is possible to obtain the synchronized video signal. Therefore, since the sampling clock frequency at the reproducing side is not restricted by the sampling clock frequency at the recording side, the same circuit arrangement can be applied to various reproducing apparatus.

The above description relates to preferred embodiments of the invention but it will be apparent that many modifications and variations could be effected by one skilled in the art without departing from the spirits or scope of the novel concepts of the invention so that the scope of the invention should be determined by the appended claims only.

We claim as our invention:

1. An apparatus for processing a plurality of component video signals which originally each extended over a horizontal interval and which have been time-compressed and arranged in sequence in one horizontal interval of said component video signals, each of said time-compressed component video signals starting at a respective starting position within the respective horizontal interval that is different from the starting position of another of said time-compressed component video signals in said respective horizontal interval, said apparatus comprising:
   means for generating a sampling clock pulse;
   sampling means for sampling said time-compressed component video signals at times determined by said sampling clock pulse and producing sampled time-compressed component video signals;
   means for time-expanding said sampled time-compressed component video signals from said sampling means;
   control signal generator means for generating a control signal representing said different starting positions of said time-compressed component video signals, respectively, within each said horizontal interval; and
   phase shifter means for shifting a phase of said sampling clock pulse in response to said control signal so that said sampling clock pulse is synchronized with each of said time-compressed component video signals at the respective starting position thereof.

2. An apparatus according to claim 1, in which said phase shifter means includes a plurality of phase control circuits, one of said phase control circuits being selected by said control signal to determine an amount of shifting of said phase of said sampling clock pulse.

3. The apparatus according to claim 2, in which said phase shifter means includes sawtooth wave generator means for producing a sawtooth wave pulse from said sampling clock pulse and comparator means for comparing a voltage of said sawtooth wave pulse with an output voltage from the selected one of said plurality of phase control circuits.

4. The apparatus according to claim 3, in which said phase control circuits include reference voltage sources.

5. The apparatus according to claim 4, in which said control signal generator means includes counter means for counting a predetermined number of said sampling clock pulses to determine the starting positions of said time-compressed component video signals, said counter means being reset by a synchronizing signal occurring at the start of each horizontal scanning period.

6. The apparatus according to claim 4, in which said phase shifter means includes means for selectively applying said output voltage of the reference voltage source of the selected phase control circuit to said comparator means in response to said control signal.

7. The apparatus according to claim 1, in which said phase shifter means includes a plurality of phase control circuits each receiving said sampling clock pulse, and selector means for selecting an output voltage of one of said plurality of phase control circuits in response to said control signal.

8. The apparatus according to claim 7, in which said phase control circuits include respective reference voltage sources.

* * * * *